United States Patent [19]
Carr et al.

[11] 3,789,581
[45] Feb. 5, 1974

[54] PROCESS FOR INITIAL REMOVAL OF SULFUR COMPOUNDS FROM GASEOUS HYDROCARBON FEEDSTOCKS BEFORE REMOVAL OF ARSENIC THEREFROM

[75] Inventors: Norman L. Carr, The Hague, Netherlands; Donald L. Stahlfeld, Glenshaw, Pa.

[73] Assignee: Gulf Research & Development Company, Pittsburgh, Pa.

[22] Filed: Apr. 27, 1972

[21] Appl. No.: 247,981

[52] U.S. Cl. .......................................... 55/73, 55/74
[51] Int. Cl. ....................... B01d 53/04, B01d 47/06
[58] Field of Search .......... 55/48, 73, 74, 179, 387; 196/46, 44; 208/88, 91; 423/210, 229, 234, 240

[56] References Cited
UNITED STATES PATENTS

| | | | |
|---|---|---|---|
| 2,779,715 | 1/1957 | Murray et al. | 208/88 |
| 2,781,297 | 2/1957 | Appell | 208/88 |
| 3,502,428 | 3/1970 | Gelbein et al. | 55/73 |
| 2,866,679 | 12/1958 | Lamont | 423/234 |
| 3,276,186 | 10/1966 | Hronas et al. | 55/73 |
| 3,416,293 | 12/1968 | Alexander | 55/73 |

*Primary Examiner*—Charles N. Hart

[57] ABSTRACT

In a process for reducing the arsenic content of a gaseous hydrocarbon stream by contacting the stream with a metal oxide sorbent dispersed upon a supporting material, the improvement comprising first removing sulfur compounds, particularly hydrogen sulfide, from the stream to render it substantially free of sulfur compounds.

15 Claims, No Drawings

PROCESS FOR INITIAL REMOVAL OF SULFUR COMPOUNDS FROM GASEOUS HYDROCARBON FEEDSTOCKS BEFORE REMOVAL OF ARSENIC THEREFROM

This invention relates to an improved gaseous hydrocarbon feedstock for passage through an arsenic removal unit and more particularly to a process for first removing sulfur compounds from a gaseous hydrocarbon stream prior to the removal of arsenic therefrom.

BACKGROUND OF THE INVENTION

It has been found that the presence of arsenic in light hydrocarbon gaseous streams produced by the catalytic cracking of petroleum has a deleterious effect upon the noble metal containing catalysts often employed in the subsequent treatment of those streams. It thus becomes desirable to reduce the arsenic content of those gaseous feedstreams to a harmless level before subjecting them to further treatment. Copper oxide and lead oxide, well dispersed upon a suitable support, have been found useful for this purpose. Although it is believed that a major portion of the arsenic contained in the gases is present as arsine ($AsH_3$), the term "arsenic" as used herein is intended to include arsenic in any combined gaseous form.

For purposes of explaining the present invention, the metal oxide used in the arsenic removal process will be termed a "sorbent". The term is not intended to suggest that the arsenic removal is accomplished by simple physical adsorption. While not wishing to be bound by any particular theory, it is believed that some chemical reaction is involved between the arsenic and the sorbent. At a minimum, it is believed that the removal of arsenic is accomplished by chemisorption; that is, the arsenic forms bonds with the surface atoms of the sorbent that are of comparable strength with ordinary chemical bonds and stronger than the bonds formed in physical adsorption.

As the arsenic-containing gases are contacted by the dispersed sorbent, an acceptable loading of arsenic is withstood by the sorbent before breakthrough. In this context, the term "breakthrough" means the passage of arsenic beyond or downstream of the substance intended to remove it and is usually expressed as a percentage of the arsenic not removed in relation to the arsenic content of the charge stock. Workers in the art have sought ways to improve the arsenic loading of the sorbents before breakthrough so that the treatment process could be operated for longer periods without the need for shutdown to replace or regenerate the sorbent.

DESCRIPTION OF THE PRIOR ART

It is known that polar compounds interfere with the removal of arsenic in certain adsorption processes. U. S. Pat. No. 3,542,669, for example, teaches that hydrogen sulfide ($H_2S$) and other polar compounds present in a petroleum feedstream will sharply reduce the capacity of activated carbon to remove arsenic from the feedstream. Presumably physical adsorption was the primary function or process involved.

The light hydrocarbon gases produced in a fluid catalytic cracking (FCC) unit, however, contain olefins which are polar compounds; yet the presence of as much as 70 percent olefins in the charge stream have presented no apparent difficulties with the removal of arsenic from refinery gas streams in the process employing the metal oxide sorbent dispersed on a support. The prior art leads one to believe that polar compounds are bad when arsenic is removed using an activated carbon. It has now been discovered that only gaseous sulfur compounds interfere seriously with the removal of arsenic when employing supported metal oxide sorbents such as copper, copper oxide or lead oxide. This would tend to confirm that the mechanism of arsenic removal in such a process is not adsorption. Thus, interference with arsenic removal in the metal oxide sorbent process caused by some other polar compound than olefins or water present in the refinery gases would not be suggested.

SUMMARY OF THE INVENTION

It has been discovered that the removal of sulfur compounds, particularly in the form of hydrogen sulfide ($H_2S$), which compounds are traditionally found in conjunction with arsenic in petroleum feedstreams, markedly increases the arsenic loading of the metal oxide sorbents before breakthrough occurs.

The present invention provides a process for reducing the arsenic content of a gaseous hydrocarbon stream by contacting the stream with copper or an oxide of copper or lead dispersed upon a supporting material, the improvement comprising: first removing sulfur compounds from said stream to render said stream substantially free of sulfur compounds, the sulfur compounds consisting essentially of $H_2S$. When copper or copper oxide is employed, the dispersed supported copper or copper oxide should have an oxygen uptake value (to be defined later) of at least 5 and more preferably at least 40.

The expression "oxygen uptake value" is a measure of the degree of dispersion of the sorbent on its support, expressed as milliliters of oxygen per gram of copper. The procedures for determining this value for a particular sorbent are detailed hereinbelow.

DESCRIPTION OF THE INVENTION

The charge stock from which arsenic is removed by contact with a copper, copper oxide or lead oxide sorbent may be a gaseous hydrocarbon feedstream and which contains arsenic as an impurity, typically in an amount from about 20 parts per billion (ppb) to about 20 parts per million (ppm) or more. It is further provided that the hydrocarbons in the feedstream have from one to five carbon atoms per molecule with minor amounts of about two percent or less of higher carbon atom molecules such as $C_6$. Preferably, the hydrocarbons in the feedstream have from one to three carbon atoms with minor amounts of about ten percent or less of hydrocarbons having from four to six carbon atoms. The feedstream normally includes olefins and water vapor. Particularly preferred for treatment are those light hydrocarbon gases obtained by the catalytic cracking of heavier petroleum hydrocarbons such as gas oils in producing gasoline. The cracking operation normally takes place in an FCC unit. These light gases from the FCC unit have been found to contain small concentrations of arsenic even though arsine, for example, is known to decompose at about 450°F. and the temperatures in the FCC unit are known to reach over 900°F. There is probably insufficient contact time in an FCC unit to decompose the arsine, or perhaps the arsine decomposes and reforms on cooling. The FCC gases may also contain sulfur compounds, usually in the form of $H_2S$, typically in an amount from greater than 1 ppm, usually 5 ppm to about 5,000 ppm or more. If a copper or copper oxide sorbent is employed, it is preferred to have the charge stock free or substantially free of acetylenes as any acetylenes present may react with the copper to form copper acetylides which in their dry state are explosive.

The sorbent employed in the arsenic removal process is converted to a high surface area form by dispersion onto a suitable high surface area support. The manner of dispersing the sorbent on the supports is not critical and may be accomplished by means well known in the art. One method involves the deposition of copper or lead from an aqueous solution of a suitable salt of the metal such as cupric nitrate or lead nitrate followed by conversion of the salt to oxide by calcining in the presence of air. The metal salt which is employed must be one which will decompose to the desired oxide form or which can be oxidized to the desired oxide form under conditions which will not impair the desired surface area characteristics of the support. Other methods of depositing copper oxide, for example, are described in U. S. Pat. Nos. 2,511,288 and 2,513,508, both to Morrell et al.

The sorbent is normally used in the oxidized form but, if desired, conversion of dispersed copper oxide sorbent to copper may be accomplished by heating the supported sorbent to at least 700°F. in the presence of flowing hydrogen, as is well known in the art. The use of lower temperatures and/or short contact times with hydrogen would result in the production of mixtures of copper oxide and copper.

The amount of copper or copper oxide dispersed on the support is suitably from 1 to 30 weight percent and preferably from 10 to 20 weight percent, both the copper and copper oxide being calculated as copper. When the sorbent is in the form of copper oxide, the copper is preferably present in its highest oxidation state, i.e. CuO.

The amount of lead dispersed on the support is suitably from 5 to 50 weight percent and preferably from 10 to 30 weight percent of the total sorbent plus support. The lead is believed to be present as an oxide of lead.

Suitable high surface area supports are those well known in the art as catalyst supports. Examples of suitable supporting materials are the usual porous naturally occurring or synthetically prepared high surface area, i.e. over about 50 m²/g, refractory metal oxides well known in the art as catalyst supports, e.g. alumina, silica, boria, thoria, magnesia or mixtures thereof. Preferably the supporting material is one of the partially dehydrated forms of alumina. More preferably, the alumina is one having a surface area in excess of 50 m²/g, preferably a surface area of 150 to 350 m²/g. Suitable forms of the higher surface area aluminas and their methods of preparation are described in the Kirk-Othmer Encyclopedia of Chemical Technology, Second Edition, Volume 2, pages 41 et seq. Other suitable supports include clays, zeolites and crystalline silica aluminas.

The arsenic removal process will operate in the presence of sulfur compounds but the loading of the supported sorbent before breakthrough will be impaired. Thus, according to the present invention, the sulfur compounds are first removed from the hydrocarbon or refinery gases before the gases are subjected to arsenic removal.

The particular method for removing the sulfur compounds from the gaseous hydrocarbon charge stock is not critical, and those methods well known in the art can be employed. Such methods include, for example, the use of liquid solutions of amines or the use of caustic solutions of sodium hydroxide. A combination of these methods may also be used. The amine solution is utilized to remove the bulk of the sulfur compounds, typically present as $H_2S$, while the caustic solution is utilized to remove small amounts of $H_2S$ which, in some instances, tend not to be removed in the amine unit.

For example, a gaseous hydrocarbon charge stock, such as a light hydrocarbon gas from an FCC unit, may typically contain about 200 ppm of $H_2S$. This gas enters the bottom of a packed tower or a tower containing a series of trays and contacts in countercurrent fashion an aqueous solution of an amine, such as monoethanolamine or diethanolamine, the amine being in a 10 to 25 percent, usually 20 percent, concentration in the aqueous solution. The contacting occurs at the pressure of the gas which may be at about 300 psig. The temperature of contacting is from 80° to 130°F, usually 100° to 110°F. There typically can be about 25 trays in a tray tower and the moles of acid gas per mole of amine is on the order of 0.3 to 0.5 The amine solution which exits from the bottom can be regenerated at pressures of about 15 to 25 psig by heating to temperatures of 250° to 350° F. to decompose the amine mixture and expel the $H_2S$. The amine solution is then cooled and recirculated.

The gas exiting from the amine tower usually contains less than 1 ppm of $H_2S$, but the gas may at times contain amounts of $H_2S$ which are somewhat in excess of this. In order to insure a low $H_2S$ level, the gas can next be contacted in a manner similar to the amine contacting with an aqueous solution of an alkali metal hydroxide, usually sodium hydroxide. The aqueous solution usually contains from 5 to 20 percent alkali metal hydroxide. The operating conditions are similar to the conditions used in the amine tower. The outlet gas is then assured of being less than 1 ppm of $H_2S$ at all times. The aqueous caustic could be used in lieu of the amine treatment, but such is more expensive as the caustic is not conveniently regenerable.

For example, a typical charge is converted in a fluid catalytic cracking unit (FCC unit) under the usual catalytic cracking conditions to yield a variety of lower boiling products, including liquid type gasoline products and gaseous hydrocarbon products. The gaseous hydrocarbons are of most concern here.

It is preferred that the $H_2S$ level of the FCC gases be as low as practically feasible. Usually the $H_2S$ level of the FCC gases after being subjected to removal of sulfur compounds as aforesaid is on the order of less than 2 ppm, preferably < 1 ppm, most preferably < 0.5 ppm. As stated above, higher amounts of $H_2S$ in the FCC gases undergoing treatment for arsenic removal can be tolerated, but such higher amounts correspondingly reduce the effectiveness of the arsenic removal process, because the $H_2S$ acts as a poison to the supported metal oxide sorbents employed therein. The sulfiding reaction apparently competes with the reaction between the arsine and the metal/metal oxide.

The concentration of arsenic in the hydrocarbon gases to be treated is reduced from a concentration in excess of 20 ppb to a concentration of less than 20 ppb. The concentration of arsenic in an FCC absorber gas may be on the order of 50 to 750 ppb but can be as high as 20 ppm or more. Preferably, the arsenic content of the gases is lowered to less than 10 ppb and more preferably to less than 2 ppb in an arsenic removal unit.

The temperatures to be employed in arsenic removal unit 14 can suitably be from 50° to 400°F., are usually from 80° to 250°F., and are preferably from 100° to 200°F. Temperatures below 50°F. are undesirable because of increased cost and the decreased activity of the sorbent at those levels. Temperatures above the stated range are undesirable due to the increased expense of operating the process. Primarily excessive temperatures are undesirable for the further reason that when feedstreams contain both olefins and hydrogen, as do FCC absorber gases, hydrogenation of the olefins is promoted by high temperature levels. At 250°F., however, it has been found that less than one percent hydrogenation of propylene is experienced in the treatment of a typical FCC absorber gas to remove arsenic in accordance with the present invention using copper. Lead does not promote hydrogenation.

The pressure to be employed in an arsenic removal unit is suitably atmospheric pressure or below to 1,000 psig or more. FCC units typically operate to produce product gases, as noted above, at pressures from about 250 to 350 psig. The process of the present invention operates well at atmospheric pressure, but since it is expensive to depressure the FCC absorber gases and repressure the final products for transport through pipelines, it is desirable to operate the arsenic removal process at increased pressures of, say, 250 to 350 psig. A limitation on the maximum operating pressure is, however, the effect of pressure on promoting undesirable side reactions such as the polymerization and hydrogenation of any olefins which may be present in the feedstream when a copper or copper oxide sorbent is employed. The gaseous volume hourly space velocity (GVHSV) at standard conditions of temperature and pressure can suitably be from 1,000 to 36,000 v/v/hr and is usually from 2000 to 10,000 v/v/hr.

Several tests were run under varying conditions to illustrate the present invention. The results of these tests are presented in Tables I and II below. The procedures employed for all tests were identical and were as follows: Gaseous charge stocks were prepared by mixing a sufficient amount of a blend of 2,000 ppm AsH₃ in nitrogen (supplied by Matheson Gas Co.) with one of the following diluent gases to obtain a charge stock having 50 ppm of AsH₃:

Diluent Gas No. 1. A pure hydrocarbon blend having the following approximate analysis:

| Component | Vol. % |
|---|---|
| Propylene | 15 |
| Ethane | 12 |
| Ethylene | 10 |
| Methane | 30 |
| Hydrogen | 15 |
| Nitrogen | 18 |
| Total | 100 |

Diluent Gas No. 2. A commercial FCC absorber gas of the following analysis:

| Component | Typical Vol. % | Range Vol. % |
|---|---|---|
| Carbon Monoxide | 1.6 | 0.2 – 3.4 |
| Hydrogen | 7.9 | 9 – 12 |
| Nitrogen | 9.8 | 6 – 10 |
| Methane | 30.0 | 27 – 33 |
| Ethylene | 9.8 | 9 – 11 |
| Ethane | 12.4 | 10 – 13.0 |
| Propylene | 17.2 | 15 – 18.0 |
| Propane | 7.6 | 7 – 15 |
| Butenes | 0.4 | 0 – 1.0 |
| Isobutane | 1.3 | 1 – 2.0 |
| n-Butane | 0.1 | 0 – 1.0 |
| C₅ | 1.7 | 0 – 3 |
| C₆ | 0.2 | 0 – 1 |
| Total | 100.0 | |
| Arsenic | 450 ppb | 50 – 750 ppb |
| Hydrogen Sulfide | 1 ppm (wt) | 0 – 2 ppm |
| Carbonyl Sulfide | 3.4 ppm (wt) | 0 – 5 ppm |

The diluent gases were passed through a water bubbler to saturate them with water vapor at ambient temperature before the arsine blend was added.

The reactor containing the supported sorbent consisted of a ⅝ inch I.D. stainless steel cylinder, with a ⅛ inch O.D. thermowell extending along its axis. The reactor was suitably heated. The temperature at the center of the supported sorbent material was measured by means of an iron-constantan thermocouple inserted into the thermowell. The test gas was introduced at the bottom of the reactor, passing through an approximately 6-inch-long bed of quartz chips which served to preheat the gas stream.

The sorbents were dispersed on gamma - alumina in accordance with the procedures generally set forth above. The bed of supported sorbent within the reactor was approximately 4 to 8 inches in length and consisted of 5–10 cc. of material sized to 20–40 mesh. Where copper oxide was employed as the sorbent, the weight percent of copper compared with the total weight of support material and sorbent was 13 percent. Where lead oxide was the sorbent, the weight percent of lead compared with the total weight of support material and sorbent was 20 percent.

The arsine not removed by the passage through the bed of supported sorbent was scrubbed from the effluent gas stream by a pyridine solution containing 0.50 g. silver diethyldithiocarbamate (Fisher Certified Reagent) per 100 ml. pyridine. This silver salt combines with the arsine to form a highly colored complex, permitting colorimetric monitoring of the total arsine breakthrough accumulation. Small samples were periodically drawn from the arsine scrubber and the optical transmittance at 540 mm. wavelength was measured with a Bausch and Lomb Spectronic 70 spectrophotometer. This optical transmittance was then plotted as a function of time. The numerical derivative of this curve was calculated to determine the rate of arsine breakthrough. The percent breakthrough figures given in the Tables below represent the percentage of the arsenic not removed in relation to the arsenic content of the charge stock.

The results of a first series of runs is shown in Table I below.

TABLE I

| Example | Sorbent | Support | Temp. °F. | Pressure psig | GVHSV | Conc. AsH₃ in Charge Stock (ppm) | Diluent Gas (Designated by No. from Description Above) | Arsenic Loading (Weight Percent) 10% Breakthrough | Arsenic Loading (Weight Percent) 20% Breakthrough |
|---|---|---|---|---|---|---|---|---|---|
| 1 | CuO | γ-Al₂O₃ | 150 | 15 | 9000 | 50 | No. 2 | 4.2 | — |
| 2 | CuO | γ-Al₂O₃ | 150 | 15 | 9000 | 50 | No. 1 ⁽¹⁾ | 1.1 | — |
| 3 | CuO | γ-Al₂O₃ | 200 | 15 | 9000 | 50 | No. 2 ⁽¹⁾ | 1.8 | 2.2 |
| REGENERATED SUPPORTED CuO FROM EXAMPLE 3, 16 HOURS IN AIR AT 250°F. | | | | | | | | | |
| 4 | CuO | γ-Al₂O₃ | 200 | 15 | 9000 | 50 | No. 2 ⁽²⁾ | 2.6 | 3.3 |
| REGENERATED SUPPORTED CuO FROM EXAMPLE 4, 10 HOURS IN AIR AT 350°F. | | | | | | | | | |
| 5 | CuO | γ-Al₂O₃ | 200 | 15 | 9000 | 50 | No. 2 ⁽³⁾ | 3.7 | 5.2 |
| REGENERATED SUPPORTED CuO FROM EXAMPLE 5, 16 HOURS IN AIR AT 700°F. | | | | | | | | | |
| 6 | CuO | γ-Al₂O₃ | 200 | 15 | 9000 | 50 | No. 2 ⁽⁴⁾ | 5.2 | 6.4 |

(1) Charge contained 200 ppm H₂S
(2) No H₂S; Total As loading 5.5% at 20% breakthrough
(3) No H₂S; Total As loading 10.7% at 20% breakthrough
(4) No H₂S; Total As loading 17.1% at 20% breakthrough Referring to Table I, the data clearly demonstrate the marked increased in arsenic loading using a copper oxide sorbent on alumina when the charge gas is free or substantially free of gaseous sulfur compounds. The data also illustrate that sorbents which have been subjected to sulfur can be regenerated.

The materials (sorbents plus support) used in the runs reported in the above Examples were tested for oxygen uptake values by the following procedure: Approximately 2.5 g. of each supported sorbent sample was heated (50°C./min) to 400°C. in flowing hydrogen (40 mls/min). Each was held at this temperature for 2 hours, then treated in flowing helium (40 mls/min) for one hour at the same temperature. Oxygen uptake values were measured after the samples were cooled to 25°C. by the pulse adsorption method fully described in the article "Separate Determination of the Surface of Complex Catalysts by Chromatographic Methods. 1. Nickel on Carriers" by N. E. Buyanova, et al, appearing first in Kinetika i Kataliz. Vol. 8, No. 4, pp. 868–877, July-August, 1967, and translated into English and appearing in Kinetics and Catalysis, 8, 737 (1967).

The oxygen uptake values for the sorbents used in Table I, expressed in terms of oxygen uptake at 77°F. in units of S.T.P. ml. of oxygen per gram of copper on the sample, was 54.

The copper oxide-gamma-alumina materials used in Table I were prepared by the incipient wetness technique (minimum excess solution) using an aqueous copper nitrate solution. The incipient wetness absorptivity of the alumina was 0.8130 ml/g of alumina. The wet material was dried at 250°F. and calcined at 1,000°F. for 15 hours. The compacted density was 0.730 g/cc and it had a nitrogen B.E.T. surface area of 180.6 m²/g and a nitrogen pore volume of 0.491. The final composition was about 13 weight percent copper and 87 weight percent Al₂O₃. The alumina used in this preparation had an initial nitrogen B.E.T. surface area of 282 m²/g and a nitrogen pore volume of 0.63 cc/g.

The lead oxide sorbent used in Table II below was typically prepared as follows: An aqueous solution of lead nitrate was prepared by adding 837.21 g. of Pb(NO₃)₂ (Mallinckrodt Analytical Reagent Grade) to distilled water to give a final volume of 1,670 ml. The weight of this solution was 2,322 g. and its specific gravity was 1.3904 g/cc. It contained the equivalent of 22.55 percent Pb.

A one-step incipient impregnation of the alumina was carried out by adding, with stirring, the Pb(NO₃)₂ solution to 2055 g. of 1/16 inch extrudates of a suitable alumina which had previously been heated to 1,000°F. over a period of 6 hours and held at 1,000°F. for 10 hours. The incipient wetness absorptivity of the alumina was 0.8127 ml/g of alumina. The wet material was dried with occasional stirring for 12 hours at 250°F. The dry material was then calcined by raising the temperature to 1,000°F. over a period of 6 hours and holding at 1,000°F. for 9 hours. The final composition of the material was approximately 20 weight percent Pb, 80 weight percent Al₂O₃. The compacted density was 0.804 g/cc and it had a nitrogen B.E.T. surface area of 160 m²/g and a nitrogen pore volume of 0.471.

The final sorbent was off-white in appearance. X-ray analysis of the sorbent showed the presence of some crystalline lead sulfate, which is white. There is a small amount of sulfate associated with the alumina base (1.08% sulfur), and this probably accounts for the presence of the lead sulfate. A similar preparation using a very low sulfur base (0.08%) showed the presence by X-ray diffraction analysis of the complex 4PbO·PbSO₄ which is also white. The lead nitrate from which the sorbent was prepared is known to decompose at conditions far less severe than the calcination conditions. Thus, while it is not certain, due to the complex chemistry of lead oxides, it is believed the lead is primarily present as PbO or some combination of PbO with lead sulfate due to the light color of the finished sorbent. Other forms of lead oxide such as PbO₂, Pb₂O₃ and Pb₂O are highly colored.

The results of a second series of runs using a lead oxide sorbent are summarized in Table II below.

TABLE II

| Example | Sorbent | Support | Temp. °F. | Pressure psig | GVHSV | Conc. AsH$_3$ in Charge Stock (ppm) | Diluent Gas (Designated by No. from Description Above) | Arsenic Loading (Weight Percent) | | |
|---|---|---|---|---|---|---|---|---|---|---|
| | | | | | | | | 10% Break-through | 20% Break-through | 33% Break-through |
| 7 | Lead Oxide | γ-Al$_2$O$_3$ | 120 | 15 | 3000 | 50 | No. 1 [1] | 0.02 | — | 0.19 |
| 8 | Lead Oxide | γ-Al$_2$O$_3$ | 150 | 15 | 3000 | 50 | No. 2 | 0.69 | 1.2 | — |

(1) Charge contained 200 ppm H$_2$S

Referring to Table II, the data again illustrate the marked increase in arsenic loading using a lead oxide sorbent on alumina when the charge gas is free or substantially free of gaseous sulfur compounds.

The method of preparation of the lead oxide material was the same as for the preparation of the copper oxide material above except, of course, a solution of Pb(NO$_3$)$_2$ was used. The final calcined composition analyzed 20 weight percent lead calculated as the metal. The compacted density was 0.804 g/cc and it had a nitrogen B.E.T. surface area of 160 m$^2$/g and a nitrogen pore volume of 0.471. The same alumina was used as in the Table I materials.

The terms "ppb" and "ppm" in this application mean parts per billion and parts per million, respectively, both parts measured by volume.

Resort may be had to such variations and modifications as fall within the spirit of the invention and the scope of the appended claims.

We claim:

1. In a process for reducing the arsenic content of a gaseous hydrocarbon stream by contacting the stream with a metal oxide sorbent dispersed upon a supporting material, the improvement comprising:
   first removing sulfur compounds from said stream to render said stream substantially free of sulfur compounds before said stream is treated for the reduction of its arsenic content.

2. The improvement recited in claim 1 wherein said sulfur compounds consist essentially of hydrogen sulfide.

3. In a process for reducing the arsenic content of a gaseous hydrocarbon stream by contacting the stream with a sorbent, dispersed upon a supporting material, said sorbent comprising copper or an oxide of copper and having an oxygen uptake value of at least 5, the improvement comprising:
   first removing sulfur compounds from said stream to render said stream substantially free of sulfur compounds before said stream is treated for the reduction of its arsenic content.

4. The improvement recited in claim 3 wherein said sulfur compounds consist essentially of hydrogen sulfide.

5. In a process for reducing the arsenic content of a gaseous hydrocarbon stream by contacting the stream with a sorbent dispersed upon a supporting material, said sorbent comprising lead oxide, the improvement comprising:
   first removing sulfur compounds from said stream to render said stream substantially free to sulfur compounds before said stream is treated for the reduction of its arsenic content.

6. The improvement recited in claim 5 wherein said sulfur compounds consist essentially of hydrogen sulfide.

7. A process which comprises:
   treating a charge stock comprising a major portion of gaseous hydrocarbons which have from one to five carbon atoms per molecule, at least 20 parts per billion of arsenic, and at least 1 part per million of a gaseous sulfur containing compound, to remove said sulfur containing compound; and thereafter contacting the feedstream substantially free of said sulfur compounds with a metal oxide sorbent dispersed upon a supporting material.

8. A process according to claim 7 wherein the sorbent material is lead oxide.

9. A process according to claim 7 wherein the sorbent material is copper oxide.

10. A process according to claim 9 wherein at least a portion of said sulfur compounds is removed by contacting the charge stock with an aqueous solution of an amine.

11. A process which comprises:
    treating a charge stock comprising a major portion of gaseous hydrocarbons which have from one to five carbon atoms per molecule, at least 20 parts per billion of arsenic, and at least one part per million of a gaseous sulfur containing compound, to remove said sulfur containing compound by a sequential two-step process involving first contacting said charge stock with an aqeuous solution of an amine followed by contacting of the gaseous hydrocarbon with an aqueous solution of an alkali metal hydroxide;
    and thereafter contacting the charge stock substantially free of said sulfur compounds with a metal oxide sorbent dispersed upon a supporting material.

12. A process according to claim 11 wherein the amine is a monoethanol amine and the alkali metal hydroxide is sodium hydroxide and the metal oxide sorbent is copper oxide.

13. A process which comprises:
    treating a charge stock comprising a major portion of gaseous hydrocarbons which have from one to five carbon atoms per molecule; at least 20 parts per billion of arsenic; and at least one part per million of a gaseous sulfur containing compound, to remove said sulfur containing compound;
    thereafter contacting the charge stocks substantially free of said sulfur compound with a metal oxide sorbent dispersed upon a supporting material at a temperature from 80° to 250°F.; and
    thereafter recovering said gaseous hydrocarbon stream having less than 20 parts per billion of arsenic.

14. A process according to claim 13 wherein the sorbent material is lead oxide.

15. A process according to claim 13 wherein the sorbent material is copper oxide.

* * * * *